Feb. 20, 1962    E. C. KOERNER ETAL    3,022,200
MAGNET WIRE AND METHOD OF MAKING SAME
Filed Oct. 12, 1960
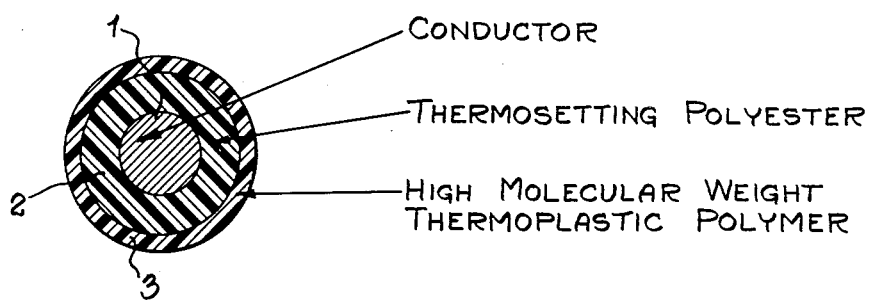
INVENTORS
ERNEST C. KOERNER
RALPH HALL
BY EARL L. SMITH
Davis, Hoxie, Faithfull & Hapgood
ATTORNEYS United States Patent Office 3,022,200
Patented Feb. 20, 1962

3,022,200
MAGNET WIRE AND METHOD OF
MAKING SAME
Ernest C. Koerner, Ralph Hall, and Earl L. Smith, Fort Wayne, Ind., assignors to Phelps Dodge Copper Products Corporation, Fort Wayne, Ind., a corporation of Delaware
Filed Oct. 12, 1960, Ser. No. 62,235
18 Claims. (Cl. 117—218)

This invention relates to insulated electrical conductors and more particularly to such a conductor, especially magnet wire, having improved insulation of the varnish or enamel type, and to a method of making the same.

Over recent years, there has been increasing use of thermosetting polyester resins for electrical insulation purposes, as for insulating magnet wire. The thermosetting polyester resins used for wire insulation are of various forms but commonly consist essentially of the reaction products of a polyhydric alcohol, a glycol and a dicarboxylic acid or a lower alkyl ester thereof, the resin being commonly cured with a metal catalyst such as zinc, titanium, litharge, lead, etc. Such resins have shown remarkable thermal stability when measured in accordance with standard procedures in the electrical industry, such as the dielectric twist procedure of AIEE No. 57. Moreover, they are readily soluble in organic solvents and can be applied to bare copper or aluminum wire by conventional coating methods using wiping dies followed by curing at high temperature (500–1000° F.), the resin solution generally being applied in multiple coats each cured before application of the next coat.

Examples of polyester resins of the type described, which have been used to advantage for magnet wire insulation, are:

(1) An ester of terephthalic or isophthalic acid reacted with glycerine and/or pentaerythritol plus small quantities of silanes or siloxanes, and (2) Esters of terephthalic or isophthalic acid reacted with:

(a) Glycerine or pentaerythritol and
(b) Ethylene glycol or butane diol 1,4 or a mixture thereof.

These various polyesters are disclosed in U.S. Patents 2,686,739, dated August 17, 1954; 2,686,740, dated August 17, 1954; 2,889,304, dated June 2, 1959; and 2,936,296, dated May 10, 1960.

Certain modified polyester resins of the thermosetting type have also been so used. These are produced by adding to the dihydric and polyhydric alcohol-terephthalic acid polyester in essentially linear form a substantial proportion of another reactant, such as an isocyanate of the more thermally stable type, which serves as the predominant cross-linking agent in curing the resin on the conductor. One such isocyanate commonly used for this purpose is the trimer of a trisubstituted phenol or cresol blocked cyanuric acid (such as Mondur SH, a product of Mobay Chemical Company, Pittsburgh, Pennsylvania) having the following structural formula:

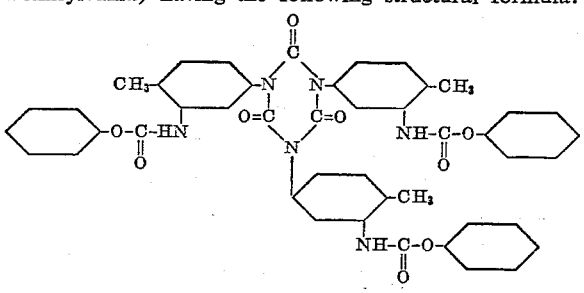

These isocyanate resins, such as Mondur SH, tend to improve thermal stability, slightly reduce heat and solvent shock and, because of their active cross-linking, harden and toughen the finished film as well as improve its electrical properties.

These prior resins of particular utility in the present invention can be described as a thermosetting polyester or modified polyester which is either (a) the cured reaction product of both di and polyhydric alcohols and a dicarboxylic acid or its ester (generally an ester of iso or terephthalic acid) or (b) formed by adding to the components included under (a) above, in linear polymeric form, a cross-linking reactant such as an isocyanate of the type described above, and curing the resin with this additional reactant. More briefly, they may be described as thermosetting polyester or modified polyester resins of the dihydric alcohol-polyhydric alcohol-dicarboxylic acid type, hereinafter referred to at times as "thermosetting polyester resins." The inclusion of a metal catalyst in the resin solution, such as zinc, lead, titanium, etc., tends to promote cross-linkage and increase the cure rate.

The use of such thermosetting polyester resins for magnet wire insulation has been dictated by the need for greater resistance to prolonged heating to permit operation of an electrical device using the magnet wire at higher temperature without sacrifice in the life of the device. However, a basic deficiency in magnet wires coated with them is that they are subject to what is known in the magnet wire industry as heat shock and solvent shock. That is, when they are stretched or bent (as during winding and assembly) and then heated, the coating can develop cracks. These cracks are voids or open spaces in the insulation and can cause failure in service of electrical devices in which the wire is used. Also, when the film or coating is stretched and bent (as in normal winding of electrical devices) and then immersed in varnish containing organic solvents such as xylol, naphthas, etc., the hot solvent during baking causes the film or coating to crack and peel (solvent shock), this being another cause of electrical failures.

Eliminating or reducing the heat shock and solvent shock in these thermosetting polyester-coated wires has been recognized as obviously desirable; but so far as we are aware those skilled in the art have not heretofore succeeded in doing so. For one thing, it is not apparent how the thermosetting polyester itself could be modified effectively for this purpose without detracting from its overall properties which make it desirable as wire insulation. Moreover, while polymers such as "Formvar" (polyvinyl formal-phenolic, Patent 2,307,588) or "Formvar" reacted with a urethane (Hall et al. application Serial No. 551,193, filed December 5, 1955) when applied to the bare wire do not cause heat shock, we find that they do not overcome the heat shock problem when coated over a thermosetting polyester on the wire. On the other hand, although a polymer such as nylon (poly hexamethylene adipamide) does not heat shock when applied to the bare wire and will eliminate heat shock when applied as an outer coating, nylon does not have the thermal resistance of the polyesters and therefore seriously detracts from the thermal resistance of the finished wire, making it an unacceptable Class F (155° C.) rated product.

The principal object of the present invention, therefore, is to provide an electrical conductor insulated with a thermosetting polyester or modified polyester of the type described but which substantially eliminates heat shock and solvent shock without detracting from the desired properties of the polyester insulation. A further object is to provide such a conductor suitable for continuous operation up to 155° C. (Class F) or higher.

Another deficiency in these polyester-coated wires is a low order of abrasion resistance and windability, which has caused some difficulty when using high speed winding machines. Also, with the increased use of stronger bonding varnishes containing more active solvents, there has been a need for a wire with better solvent resistance to withstand safely the softening action of these varnishes.

An additional object of the invention, therefore, is to provide such a wire having improved abrasion resistance and windability and improved solvent resistance.

We have discovered that the deficiencies in wires insulated with a polyester or modified polyester of the type described can be eliminated for all practical purposes by applying over the layer of thermoset highly cross-linked polyester a thin layer of a highly linear thermoplastic polymer having certain characteristics, as follows:

(1) A melting point above 175° C.
(2) A relative viscosity above 1.3.
(3) A tensile strength at 175° C. of at least 30,000 lbs./sq. in.
(4) Super polymer characteristics, whereby the polymer is capable of forming a fiber and of being cold drawn.
(5) A thermal life of at least 4,000 hrs. at 200° C. when coated on a #18 Heavy film wire to give a 0.003 in. increase in diameter, using AIEE Twist Procedure No. 57 with 1,000 volts as a failure criterion.

The thickness of the outer layer of the linear polymer normally should be at least 10% of the thickness of the inner layer of non-linear polyester but substantially thinner than the inner layer.

Such an outer layer improves physical toughness and solvent resistance and, particularly, eliminates heat shock and solvent shock.

The effectiveness of the outer linear polymer in eliminating heat shock is determined by a heat shock test consisting of 15% elongation of the multi-coated wire, followed by winding it on a 3X mandrel and maintaining it for one hour at 175° C. No heat shock shall be evident as a result of this test. A similar test of this same characteristic can be made with the wire stretched 15%, wound on a 3X mandrel and immersed in boiling xylene for ten minutes at 135° C., the boiling point of xylene (solvent shock).

Relative viscosity is determined by determining the viscosity of a 1% solution of the polymer at 25° C. divided by the viscosity of the solvent at 25° C. For the terephthalic linear polyesters described later, a solvent identified as Pitt-Consol No. 55 having the following analysis by weight was used:

| | Percent |
|---|---|
| Phenol | 25.2 |
| Ortho-cresol | 40.0 |
| Ethyl phenol | 1.6 |
| Meta para cresol | 30.9 |
| Xylenol 2,4 and 2,5 | 0.4 |
| Xylenol 2,6 | 1.9 |

However, for other polymers of the specified characteristics other solvents can be used. The relative viscosity is a measure of molecular weight, which must be sufficiently high to provide the necessary linear characteristics in the polymer.

When the wire is stretched, bent and under strain at the elevated temperature, it is important that the outer coating have a high tensile strength. This tensile strength should be at least 30,000 lbs./sq. in. at the test temperature of 175° C.

Super polymer characteristics refer again to the high molecular weight and linearity of the polymer, which makes it possible for the outer coating to form a strong bond even at the elevated temperature, thereby preventing heat shock. Such characteristics depend on the ability of the polymer to form a fiber and be cold drawn, following conventional technique of determining fiber-forming characteristics. This can be done either by the hot melt method of forming fibers or by the precipitation method from solution.

Of particular importance in the definition of the outer coat polymer is its thermal life. The most effective means of measuring thermal life is to use the procedure developed by AIEE, identified as AIEE Twist Procedure No. 57. This essentially is a dielectric test procedure where the electrical properties of the insulating film are measured as a function of time at certain temperature. Specifically, the most effective test is to use a #18 Heavy film wire with a 0.003 increase in diameter, impulsing this at 1,000 volts after aging until an end point is determined. The end point is determined when the sample fails at 1,000 volts. This is a well recognized procedure used throughout the industry as a means of thermally rating magnet wire, and it is on this procedure that the specified value of at least 4,000 hours at 200° C. is based. The application of a polymer overcoat of poor thermal characteristics will detract from the overall performance of the wire, resulting in a wire that cannot be rated at 155° C. One important characteristic, therefore, of the outer coat is that it shall have thermal capabilities which shall not detract from the underlying polyester or modified polyester. Specifically, the application of a nylon derived from hexamethylene adipamide (type 66 nylon) will detract seriously from the overall thermal performance of the wire, although it may meet the other requirements specified for the outer coat.

For the thermoplastic linear polymer of the outer layer, a polyester resin obtained by reacting a dihydric alcohol with an aromatic dicarboxylic acid is particularly suitable. Preferably, the linear polymer is a glycol-terephthalate polyester of predominantly high molecular weight, such as polyethylene terephthalate known in the trade as "Dacron" or "Mylar." Examples of other such linear polyesters well adapted for this use are a polycyclohexylene dimethylene terephthalate known in the trade as "Kodel" of the fiber-forming type, a polyethylene terephthalate known as "Celanese Polyester Fortrel" (a product of Fiber Industries, Inc.), and a polyethylene terephthalate isoterephthalate product of Goodyear known as "Vicron." Also suitable for this purpose is a poly aromatic poly carboxylic aromatic imide known as Du Pont's "M-L." This super polymer has good thermal life and, like the terephthalic base materials, can eliminate heat and solvent shock and meet the other requirements of a high temperature Class F (155° C.) magnet wire.

The polyethylene terephthalic adipates as well as the conventional nylon type 66 are unsuited for the outer layer as they do not have the required thermal stability. Nylon is also very poor in moisture resistance and limits the electrical properties of the finished film. A comparison of the thermal life of conductors having nylon and "Dacron," respectively, coated over a cross-linked polyester is given in the following tabulation of test results on identical conductors coated with the same inner layer of the polyester-cyanurate of Example I appearing hereafter, the "A" conductors having an overcoating of "Dacron" and the "B" conductors having an overcoating of nylon type 66, the overcoating in each case having a thickness which is 13% of the inner layer thickness. The tests were made according to AIEE No. 57 to show the number of hours to failure.

| ° C. | A, hours | B, hours |
|---|---|---|
| 240 | 165 | 36 |
| 225 | 525 | 130 |
| 200 | 5,500 | 419 |

Likewise, unsuitable for this application are such resins as "Formvar" (polyvinyl formal phenolic) and "Butvar" (polyvinyl butaryl) primarily because, although they have a high molecular weight, they have a low softening point and are not linear but cross-linked and do not have high tensile strength at 175° C.

A polyethylene terephthalate polymer having a relative viscosity of 1.15, indicating it to have low molecular weight when used as an outer layer, failed to reduce heat shock in the finished wire. This same polymer when carried to a relative viscosity above 1.3 (with a corresponding high molecular weight) did eliminate the heat shock.

The linear thermoplastic polymer of the outer insulating layer of a wire made according to the invention acts as a rubber-like band of high tensile strength which, when the conductor is bent or stretched and heated, prevents heat shock in the underlying layer of the non-linear polyester or modified polyester. Further, the greater toughness and insolubility of this outer layer greatly enhance the physical and chemical properties of the finished wire. Also, since highly linear polymers such as dihydric alcohol-terephthalate polyesters have excellent heat resistance, they do not detract from the overall thermal properties of the finished wire, still permitting operation at 155° C. (Class F or above).

While solutions of certain of the aromatic homo-polyesters, such as polyethylene terephthalate, are known to have a marked inability to wet or adhere to a metallic surface, they readily adhere to the inner layer of the new conductor when applied by conventional wire-coating methods. Moreover, although they are relatively insoluble as compared with the thermosetting polyester or modified polyester of the inner layer, so that they are normally applied in a solution of relatively low solids content, this is compensated by the fact that the outer layer is substantially thinner than the inner layer.

Examples of the polyester or modified polyester solution for coating the inner layer are disclosed in Patents Nos. 2,889,304 and 2,936,296, granted June 2, 1959, and May 10, 1960, respectively, and the following additional examples in which the percentages are by weight:

*Example I*

| | Percent |
|---|---|
| Mondur SH | 6.8 |
| Multron F–72 | 23.2 |
| Cresylic acid | 46.14 |
| Solvesso 100 | 23.30 |
| Zinc octoate (8% Zn) | 0.56 |

Mondur SH, a blocked isocyanate, has been previously described. Multron F–72 is made from approximately 47 parts terephthalic acid, 36 parts glycol and 17 parts glycerine, on a mole-percentage basis. The cresylic acid is a tar acid boiling between the range of 180°–230° C. Solvesso 100 is a solvent naphtha, a hydrogenated petroleum solvent of high aromatic value. The resinous coating solution weighs 8.83 lbs./gal., of which 2.70 lbs. are solids. In preparing the resinous coating solution, the solvents and the F–72 resin were weighed off and the mixture heated to 137–139° C. with constant stirring for 30 minutes, during which water-containing vapor was allowed to escape. After cooling the mixture to 100–120° C., the Mondur SH was added gradually with continuous stirring. The vessel was then closed and in about 30 minutes the SH was completely dissolved. The solution was then heated to 120° C. and maintained at this temperature for 1 hour. The varnish was then cooled to at least 60° C., to which was then added the zinc octoate cut in equal amounts of cresylic acid and Solvesso 100. The varnish was then filtered and had a viscosity of 500–900 cps. at 86° F. It can then be coated and cured on the wire by following conventional wire-enamelling procedures, using wiping dies and an oven temperature of 400–500° C.

*Example II*

| | Percent |
|---|---|
| Mondur SH | 4.0 |
| Multron F–72 | 25.0 |
| 882 Resimene | 2.0 |
| Tetrabutyl titanate (20% solution in cresylic acid) | 2.5 |
| Cresylic acid | 43.1 |
| Solvesso 100 | 23.4 |

882 Resimene is an alcoholated or butylated derivative of the condensation product of melamine and formaldehyde, as described in Bulletin No. 1058 prepared by Monsanto Chemical Company. It is supplied as a 66% solid solution in xylene. The mixing, coating and curing procedures are essentially as previously described, except that the mixing is done at lower temperature (80–90° C.) and the mixture cooled before adding the Resimene and titanate. The coating solution contains 30.5% solids and has a viscosity of 300–450 cps. at 86° F.

Examples of the coating solution for the outer layer are as follows:

*Example III*

Du Pont's "M-L" previously identified, which is sold as a solution or varnish ready for use in coating magnet wire.

*Example IV*

Pour 875 parts of cresylic acid (Pitt-Consol No. 55) into a stainless steel container, heat it to 80–90° C., and add with gentle stirring 125 parts of Dacron No. 54 (Du Pont) in small portions. Under these conditions, the polyester will readily disintegrate in the liquid. Then add 10 parts of xylene with stirring, close the container, and apply suction to remove xylene together with any water that may be in the cresylic acid or adhering to the polyester. Check the quantity removed by measuring the condensate or by loss of weight of the batch and make certain that all of the xylene has been withdrawn. Then discontinue the suction, heat the mixture to 110–120° C. in a closed container with gentle stirring, maintain this temperature for 30 minutes, cool to below 60° C., and filter. The solution, now ready for coating, has a viscosity of 195–200 cps. and a solids content of 12.5%, and weighs 8.90 lbs./gal. The coating and heating procedures may be identical with those used for the undercoat.

*Example V*

The procedure noted in Example III above is followed except for the substitution of "Mylar" or "Terylene" for the "Dacron."

*Example VI*

The procedure noted in Example III above is followed except for the substitution of "Kodel" of the fiber-forming type for the "Dacron."

As previously mentioned, the outer layer of thermoplastic linear polymer should be at least about 10% of the thickness of the inner layer of thermosetting non-linear polyester or modified polyester. This is particularly so for round wire "Triple," sizes 8 through 40. For square and rectangular wire as well as round wire "Single" and round wire "Heavy," the outer layer should constitute at least 13% of the total thickness or "build" of the combined inner and outer layers. On the other hand, the outer layer should be substantially thinner than the inner layer and preferably not greater than 25% of the inner layer thickness. Normally, the desired ratio of the two layer thicknesses can be obtained by applying from three to seven coats of the inner layer material and one or at most two coats of the outer layer material, each coat being applied by a wiping die and oven-cured in the conventional manner before application of the next coat.

To illustrate further the advantages of the present invention, comparative tests were made with identical #18 AWG (.0403") Heavy Build (.003" nominal increase in diameter due to insulation) magnet wires insulated with (X) "Formvar," (Y) a layer of coatings of the polyester-cyanurate from Example I, and (Z) a layer similar to (Y) plus an outer coat of the polyethylene terephthalate of Example IV (about 13% of the (Y) layer thickness), with the following results:

esters are disclosed in said Patents Nos. 2,686,739 and 2,686,740.

The outer layer 3, in its preferred form, may be described as a thermoplastic linear polyester having a melting point of at least 175° C. and a relative viscosity above 1.3 and consisting essentially of the product of

|  | X | Y | Z |
|---|---|---|---|
| Physical properties: |  |  |  |
| A. Abrasion: |  |  |  |
| 1. Abrasion scrape NEMA—Strokes (avg.) | 81 | 54 | 61. |
| 2. Unilateral scrape NEMA—Grams (avg.) | 1,404 | 1,175 | 1,504. |
| B. Film flexibility NEMA | 20% 1X | 20% 1X | 20% 1X. |
| C. Snap-quick jerk NEMA | OK—Breaking point | OK—Breaking point | OK—Breaking point. |
| Chemical properties: |  |  |  |
| A. Solvent resistance: |  |  |  |
| 1. 24 hrs. room temp. tests NEMA—Fingernail: |  |  |  |
| (a) VM&P naphtha | OK | OK | OK. |
| (b) Toluene | OK | OK | OK. |
| (c) Ethyl alcohol | Slightly soft | OK | OK. |
| (d) Trichloroethylene | Softens | Slightly soft | OK. |
| (e) Butyl acetate | Slightly soft | OK | OK. |
| (f) Mild alkalies | OK | OK | OK. |
| (g) Mild acids | OK | OK | OK. |
| 2. Short time (10 min.) room temp. solvent tests: |  |  |  |
| Boiling | No | No | OK. |
| Toluol alcohol | Blistering but soft | Blistering, but slightly soft | No softening. |
| B. Refrigerant R-22 tests: |  |  |  |
| 1. R-22 extractions | 2.0% | 1.0% | 0.4%. |
| 2. Methanol extractions | 4.0% | 0.3% | 0.0%. |
| 3. R-22 softening | Fail | Borderline | Pass. |
| C. Solvent shock: |  |  |  |
| 5 min. in boiling | 20% 3X | 0% 3X—OK | 20% 3X. |
| Xylene (135° C.) | OK | 10% 3X—Fail (peels) | OK. |
| Thermal properties: |  |  |  |
| A. AIEE #57 twist tests—unvarnished samples—#18 AWG heavy film: |  |  |  |
| 1. 125° C | 6,700 hrs | Beyond estimation | Beyond estimation. |
| 2. 150° C | 1,600 hrs | do | Do. |
| 3. 175° C | 420 hrs | 100,000 hrs.¹ | 100,000 hrs.¹ |
| 4. 200° C | 150 hrs | 6,000 hrs | 5,500 hrs. |
| 5. 225° C |  | 600 hrs | 525 hrs. |
| 6. 240° C |  | 160 hrs | 130 hrs. |
| B. Extrapolated temp from. AIEE #57 at 20,000 hrs | 107° C | 190° C | 188° C. |
| C. Phelps Dodge class rating and AIEE #1 | A(105° C.) | F(155° C.) | F(155° C.). |
| D. Cut-through: |  |  |  |
| 1. Constant pressure (avg.) 2,000 grams | 205° C | 290° C | 305° C. |
| 2. Variable pressure 200° C.—Gauge lbs | 8 | 17 | 30. |
| E. Heat shock: 1 hr. at 175° C | 20% 3X—OK | 0% 3X—OK, 10% 3X—Fails badly | 20% 3X—OK. |
| F. Cold flexibility: 16 hrs. at −50° C. then wound on 1X mandrel. | OK | OK | OK. |
| Electrical properties: |  |  |  |
| A. Dielectric twist: NEMA, volts per mil | 3,100 | 3,800 | 4,530. |
| B. Insulation resistance after water boil, megohms (avg. range). | 200,000 | 500,000 | 500,000. |
| C. Dielectric twist at temperature (avg. 10 samples), volts per mil: |  |  |  |
| 1. 100° C | 3,450 | 4,230 | 4,600. |
| 2. 125° C | 3,100 | 3,450 | 3,590. |
| 3. 150° C | 2,530 | 3,130 | 3,370. |

¹ By extrapolation.

An embodiment of the invention is illustrated in the accompanying drawing, in which the single illustration is a cross-sectional view of an insulated magnet wire comprising a conductor 1, such as copper wire, an inner layer 2 made up of multiple coatings of the non-linear thermosetting polyester or modified polyester, and an outer layer 3 formed of a coating of the highly linear thermoplastic polymer. Assuming a typical wire size and grade, namely, No. 18 AWG (.0403" bare) in a heavy grade (nominal .003" increase in diameter due to the insulation), the inner layer 2 and the outer layer 3 are, for example, .0013" and .0002", respectively, in thickness. In the illustrated example, the layers 2 and 3 are the resins from Example II and Example IV, respectively.

The resin of the inner layer 2 is preferably a non-linear thermoset polyester or modified polyester of the dihydric alcohol-polyhydric alcohol-dicarboxylic acid (or derivative thereof) type as previously described, the most desirable dicarboxylic acids and their derivatives being terephthalic and isophthalic acids and their lower alkyl esters, and the most desirable dihydric alcohol being a glycol containing from 2 to 10 carbon atoms in the molecule. However, it is possible to use for the inner layer, although to less advantage, other polyesters or modified polyesters of the non-linear thermosetting type which are soluble in an organic solvent and when cured on the conductor form a substantially hard, adherent, flexible, thermally stable and solvent-resistant insulating coating. Examples of such other thermosetting polyesters are disclosed in said Patents Nos. 2,686,739 and 2,686,740.

The outer layer 3, in its preferred form, may be described as a thermoplastic linear polyester having a melting point of at least 175° C. and a relative viscosity above 1.3 and consisting essentially of the product of reaction of an aromatic dibasic compound selected from the group consisting of terephthalic acid, isophthalic acid, acyl chlorides of these acids, lower alkyl esters of these acids, and mixtures thereof, with a lower aliphatic diol containing from 2 to 10 carbon atoms in the molecule. More preferably, the polyester is essentially the reaction product of a terephthalic dibasic compound and a straight chain diol having from 2 to 5 carbon atoms in the molecule and two primary hydroxyl groups. Determination of the relative viscosity (i.e., the ratio of the efflux time of a solution of the polymer to the efflux time of the pure solvent) has been described previously. Such determination can also be made conveniently by placing the polyester in a solution containing 1 gram of the polyester per deciliter of solvent which is a 60/40 mixture of phenol and tetrachlorethane, and using viscosity measurements made at 77° F. in a size 200 Ostwald-Kannon-Fenske viscometer.

A further example of the coating solution for the outer layer 3 is as follows:

*Example VII*

Mix 13 parts by weight of a cold-drawable ethylene glycol dimethyl terephthalate homopolyester, having a relative viscosity of 1.63 and a melting point in the range of 257–265° C., with 87 parts of a solvent system consisting (by weight) of 45% phenol, 25% o-cresol and 30% of a 50/50 mixture of meta and para-cresol containing 1% of xylenols, principally 2,4-xylenol. Heat this mixture to 240–250° F. and hold it at that temperature for 30 minutes with mild agitation to provide a solution. On cooling to room temperature, the solution has an initial viscosity of 80 seconds #4 Ford Cup at 86° F. The wire coating and heating procedures may be as previously described.

In the following claims, the term "polyester" is intended to include a modified polyester, such as the polyester-cyanurate previously described.

We claim:

1. In combination with an electrical conductor, a thin, uniform and continuous inner dielectric layer of a non-linear thermosetting polyester cured on the conductor, and a thin, uniform and continuous outer dielectric layer of a thermoplastic resin coated on the conductor over said inner layer and consisting essentially of a linear polymer having a melting point of at least 175° C., a relative viscosity above 1.3 and a tensile strength of at least 30,000 lbs./sq. in. at 175° C., said polymer being capable of forming a fiber and of being cold drawn and having a thermal life of at least 4,000 hours at 200° C. as measured by AIEE Twist Procedure No. 57 when coated on a No. 18 Heavy film wire to give a 0.003 inch increase in diameter and using 1,000 volts as a failure criterion, said outer layer being substantially thinner than the inner layer but having a thickness of at least about 10% of the thickness of the inner layer.

2. The combination according to claim 1, in which said cured polyester is essentially a polyester selected from the group consisting of (a) the polyester reaction product of both di and polyhydric alcohols and a dicarboxylic acid, and (b) the modified polyester resin formed by adding to the components under (a) above, in substantially linear polymeric form, a cross-linking reactant and curing the resin with said additional reactant.

3. The combination according to claim 1, in which said cured polyester is the reaction product of both di and polyhydric alcohols and a dicarboxylic acid ester.

4. The combination according to claim 1, in which said cured polyester is a polyester-cyanurate.

5. The combination according to claim 1, in which said cured polyester consists essentially of the reaction product of glycerine, a glycol and a compound selected from the group consisting of terephthalic and isophthalic acids and lower alkyl esters thereof.

6. The combination according to claim 1, in which said cured polyester consists essentially of the reaction product of glycerine, a glycol, a polyisocyanate and a compound selected from the group consisting of terephthalic and isophthalic acids and lower alkyl esters thereof.

7. The combination according to claim 1, in which said linear polymer is a polyester which is essentially the reaction product of a dihydric alcohol and an aromatic dicarboxylic acid.

8. The combination according to claim 1, in which said linear polymer is essentially a polyethylene terephthalate polyester.

9. The combination according to claim 1, in which said linear polymer is essentially a glycol-terephthalate polyester.

10. The combination according to claim 1, in which said linear polymer is essentially a poly aromatic poly carboxylic aromatic imide.

11. In combination with an electrical conductor, a thin, uniform and continuous inner dielectric layer of a non-linear thermosetting polyester cured on the conductor, and a thin, uniform and continuous outer dielectric layer of a thermoplastic resin coated on the conductor over said inner layer and consisting essentially of the reaction product of a dihydric alcohol and an aromatic dicarboxylic acid, said reaction product having a relative viscosity above 1.3.

12. The combination according to claim 11, in which said reaction product is a polyethylene terephthalate polyester.

13. In the manufacture of insulated magnet wire, the method which comprises passing an electrically conductive wire through a solution of a thermosetting polyester resin, thereby coating the wire with said solution, heating the coated wire to a temperature sufficient to cure the resin to a hard coat on the conductor, repeating said coating and heating steps to form on the wire a thin, uniform and continuous multi-coat layer of the cured resin as a dielectric, passing the coated wire through a solution of a linear thermoplastic polymer in a solvent, said polymer having a melting point of at least 175° C., a relative viscosity above 1.3, and a tensile strength of at least 30,000 lbs./sq. in. at 175° C., said polymer being capable of forming a fiber and of being cold drawn and having a thermal life of at least 4,000 hours at 200° C. as measured by AIEE Twist Procedure No. 57 when coated on a No. 18 Heavy film wire to give a 0.003 inch increase in diameter and using 1,000 volts as a failure criterion, thereby applying said polymer solution as an over-coating on said multi-coat layer, and heating the over-coated wire sufficiently to substantially remove said solvent and form on the wire a thin, uniform and continuous layer of the linear thermoplastic polymer as a dielectric, said linear polymer layer being substantially thinner than said multi-coat layer but having a thickness of at least 10% of the thickness of the multi-coat layer.

14. The method according to claim 13, in which said linear polymer is the product of reaction of a dihydric alcohol and an aromatic dicarboxylic acid.

15. The method according to claim 13, in which said linear polymer is a polyethylene terephthalate polyester.

16. The method according to claim 13, in which said linear polymer is a glycol-terephthalate polyester.

17. The method according to claim 13, in which said thermosetting resin is essentially a polyester selected from the group consisting of (a) the reaction product of a dihydric alcohol, a polyhydric alcohol and a dicarboxylic acid, and (b) a polyester-cyanurate.

18. The method according to claim 13, in which said linear polymer is a poly aromatic poly carboxylic aromatic imide.

References Cited in the file of this patent

UNITED STATES PATENTS

| | | |
|---|---|---|
| 2,333,922 | Foster | Nov. 9, 1943 |
| 2,889,304 | Sheffer et al. | June 2, 1959 |
| 2,935,427 | Hall et al. | May 3, 1960 |